United States Patent [19]

Yamazaki

[11] Patent Number: 5,793,639
[45] Date of Patent: Aug. 11, 1998

[54] BAGGAGE RECEIVING AND HANDLING METHOD IN AIRPORT, BAGGAGE RECEIVING AND HANDLING SYSTEM IN AIRPORT, AND BAGGAGE AUTOMATIC HANDLING APPARATUS

[75] Inventor: Minoru Yamazaki, Nishikamo-gun, Japan

[73] Assignee: Toyota Jidosha Kabushiki Kaisha, Aichi-ken, Japan

[21] Appl. No.: 711,740

[22] Filed: Sep. 10, 1996

[30] Foreign Application Priority Data

Oct. 24, 1995 [JP] Japan .................. 7-300708
Oct. 24, 1995 [JP] Japan .................. 7-300709

[51] Int. Cl.$^6$ .................................. G06F 19/00
[52] U.S. Cl. ............... 364/478.14; 235/375; 235/384; 705/5
[58] Field of Search .................. 364/478.01, 478.13, 364/478.14; 235/375, 384; 395/206, 213; 705/6, 13, 28, 29, 5

[56] References Cited

U.S. PATENT DOCUMENTS 4,711,994  12/1987  Greenberg ............... 395/213 X

FOREIGN PATENT DOCUMENTS 271 022    6/1988   European Pat. Off. .
486 973    5/1992   European Pat. Off. .
A-2-265813 10/1990  Japan .
92/17393   10/1992  WIPO .

*Primary Examiner*—Joseph Ruggiero
*Attorney, Agent, or Firm*—Oliff & Berridge, PLC

[57] ABSTRACT

An airport baggage receiving and handling method receives a passenger's baggage, identifies the baggage and processes the baggage for the passenger's flight. The method includes providing identification information, storing a result of a baggage security check, retrieving the baggage security check result, conveying the baggage security check result to the passenger, and forwarding the baggage after the baggage security check is satisfied. The identification information identifies the passenger, the baggage, and the passenger and the baggage with respect to each other, when the passenger undergoes a check-in procedure. The baggage security check result is retrieved based on the identification information of the passenger at the time of the passenger's security check. If the baggage security check result is a rejection, the passenger is permitted to satisfy the rejection. As a result, only baggage that has satisfied the security check is forwarded to a sorting section.

19 Claims, 7 Drawing Sheets

BAGGAGE RECEIVING AND HANDLING METHOD IN AIRPORT, BAGGAGE RECEIVING AND HANDLING SYSTEM IN AIRPORT, AND BAGGAGE AUTOMATIC HANDLING APPARATUS

BACKGROUND OF THE INVENTION

1. Field of the Invention

The present invention relates to a method for receiving and handling a large deal of baggage that passengers who are to board airplanes bring with themselves in an airport, a system thereof and an automatic handling apparatus. More particularly, the present invention relates to a method and a system capable of enhancing the efficiency of security check of baggage and the loading efficiency of baggage into storage rooms in airplanes, and to an automatic handling apparatus for automatically receiving and sorting the baggage.

2. Description of Related Art

In each of passenger airplanes, generally, there is provided baggage storage rooms besides passenger cabins in order to store such baggage as being an obstacle if brought in the cabins. Accordingly, a passenger would leave his baggage when checking in at an airport. The baggage checked, separately from the passenger, is loaded as a general rule into the airplane which the passenger is to board.

An airport normally has a plurality of arrival and departure platforms from which airplanes successively arrive in and depart well. Meanwhile, a passenger commonly arrives at an airport well before a departure time of the passenger's flight. In any airport, there are usually a large number of passengers who are attempting to board, one of flights and thus the extent of their baggage at one time can cause confusion.

Sorting baggage according to flights is conventionally carried out by a system, for example, proposed in Japanese Patent Application Laid-open No. 2-265813. The luggage sorting system in airport described in this gazette, as schematically shown in FIG. 7, is provided with a transport conveyer 60 in a loop form going round counterclockwise in the figure, a plurality of introduction devices 70A through 70D and a plurality of sorting sections 80A through 80N disposed around the transport conveyer 60.

Each of introduction devices 70A through 70D has a plurality of check-in desks 71A (71B, 71C and 71D) at which passengers can take boarding procedures and have their baggage checked, a receiving conveyer 72A (72B, 72D and 72D) for receiving the checked baggage, and an introducing conveyer 73A (73B, 73C and 73D) for introducing the baggage received by the conveyer 72A to the transport conveyer 60. The sorting sections 80A through 80N respectively correspond to departing flights and therefore take only the baggage to be loaded on each corresponding airplane out of the transport conveyer 60, where the baggage sorted will be put on transporters to carry it to each airplane.

In the system mentioned above, a passenger who comes in an airport can take a boarding procedure at whichever introduction devices 70A–70D and further check-in desks 71A through 71D irrespective of which airplane he is going to board. At each of check-in desks 71A–71D, disposed is an operator who inputs, in accordance with a statement by the passenger or items mentioned in a flight ticket brought by the passenger, the number of baggage and the number of the flight that the baggage is loaded on with a computer terminal device fixed in each check-in desk, and then puts a tag to the baggage of the passenger and places the baggage on the receiving conveyer 72A–72D.

The baggage put on the receiving conveyers 72A–72D is shifted through the conveyers 73A–73D to the transport conveyer, 60, moving around with the circulating transport conveyer 60. When the baggage reaches the sorting section 80A (80B, . . . 80N) corresponding to the flight on which the baggage should be loaded, there it is pushed from the transport conveyer 60 and transferred in a transporting car to carry it to the airplane of a corresponding flight.

The transport conveyer 60 being composed of a multiplied loop, the above system makes it possible to enhance the capacity of handling of the transport conveyer with its circulating speed lowered to a safety range. The transport conveyer 60 may also be provided with a waiting circle 61 to temporarily put aside the baggage for which a sorting section is not prepared yet because there is still plenty of time before the departure of a corresponding flight.

In airports, security checks are performed on not only passengers before boarding passenger planes but also their checked baggages in order to ensure flight safety and prevent crimes. In conventional baggage handling systems in airport, a security check of baggage is usually made after the baggage is checked at a check-in desk. Then, the baggage that has passed a security check is sorted into corresponding airplanes and put thereon. If the baggage is rejected in the safety check, alternatively, a passenger being the owner of the baggage is paged through a public-address system in the airport to check it up for himself and remove a cause of rejection.

The conventional baggage handling system in airport mentioned above, however, has the following problems.

The first problem is that the amount of baggage (i.e., the number of bags and other objects) to be handled has increased as airline travel has become more popular. Thus, the management of baggage has become more complicated. To enhance the capacity to handle baggage in the above system, it is conceivable that the transport conveyer 60 is formed of a multiplied loop. In proportion thereto, however, it will be necessary to increase the number of check-in desks 71A–71D and operators to be disposed therein, causing the increase in work loads and staff costs. This is a barrier in enlarging the handling capacity.

The second problem is in the inefficiency in coping with a situation where baggage is rejected at the time of a security check. In detail, even if the passenger who owns the rejected baggage is paged through a public-address system in the airport, he will not always appear immediately. This has caused an inconvenience that baggage rejected at a security check must be kept until its owner appears to address the cause of rejection. The owner of the baggage often does not appear immediately in response to the paging because he utilizes shops, restaurants, etc. in the airport.

Usually, the baggage that has passed the security check is designated for the appropriate airplane and loaded thereon. There is, however, a case that the owner of the baggage already loaded on an airplane does not get on the airplane even up to a departure time. In this case, the baggage must be discharged from the airplane prior to departure in order to prevent any possible problem because of the absent passenger's baggage being the airplane. Even if there is no possibility of a crime caused by this baggage, it becomes troublesome to promptly return the baggage back to its owner if the baggage has been loaded on a wrong flight. It is not preferable for distinction between passenger flight and cargo flight. However, since such case is not considered when baggage is loaded on the airplane, the baggage that must be discharged therefrom is sometimes put deep inside of a storage room of the airplane, thus making removal of this baggage difficult.

SUMMARY OF THE INVENTION

The present invention has been made in view of the above circumstances and has an object to overcome the above problems and to provide baggage receiving and handling method capable of efficiently handling the baggage rejected in a security check.

The second object of the present invention is providing a system capable of loading only the baggage of the passengers who is certainly going to get board on an airplane into a storage room thereof so that discharge of the baggage already loaded on the airplane is not needed.

The third object of the present invention is to provide automatic baggage handling apparatus, which enables to easily enhance the capacity of handling baggage by making passengers operate for themselves to check the baggage without arranging any operator.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the first purpose of the invention, as embodied and broadly described herein, a baggage receiving and handling method to receive passenger's baggage and load the same on an airplane, the method of this invention comprising the steps of providing an identification information whereby to identify the passenger and the baggage respectively to the passenger and the baggage when the passenger takes a check-in procedure, storing a result of a security check on the baggage, retrieving the baggage security check result based on the identification information of the passenger at the time of a security check on the passenger himself, informing the passenger of the baggage security check result if a rejection is included therein to let the passenger remove the cause of rejection, and forwarding the baggage to which the rejection is dissolved into a sorting section according to a flight.

In the baggage receiving and handling method according to the present invention, when a passenger takes a check-in procedure, an identification number (a special code) is given to the passenger and his baggage, thereby enabling to identify each passenger and each baggage. This identification information makes it possible to find a passenger based on his baggage and inversely the baggage based on its owner (passenger). When a passenger checked in two pieces or more of baggage, the baggage is provided individually with an identification information. This identification information is recorded in a tag and a boarding pass, which are applied to a baggage and a passenger respectively. The baggage with the identification information is separated from the passenger and then subjected to a security check. The result of the security check is stored.

On the other hand, the passenger having a boarding pass with the identification information is subjected himself to a security check. At that time, the stored result of the baggage security check is retrieved based on the identification information of the passenger and, if the baggage security check result includes rejection, the result will be informed to the passenger, so that he removes by himself the cause rejection of the baggage. When the cause of rejection is removed, the baggage is forwarded to a sorting section and then loaded on a storage room of the airplane that the passenger is going to get on. In this way, a passenger surely has a security check for himself prior to boarding, so that the baggage rejected at the baggage security check can efficiently be handled by the passenger receiving the baggage security check result. Even if all of a passenger's baggage has been passed in the baggage security check, those results may be informed the passenger at the time of his security check.

In the present invention, it is possible to comprise the steps of storing information of baggage, reported by a passenger when he makes a reservation, and providing a reservation information whereby to identify the reservation, and retrieving the information of passenger's baggage based on the reservation information provided to the passenger and providing the identification information to the passenger and his baggage.

In this aspect, since the information of the baggage has been reported by a passenger in reserving a flight, if the passenger states the information of reservation at the time of a check-in procedure, the information of the baggage reported in advance is retrieved, so that a passenger having a reservation can efficiently be given an identification information.

It is also possible to comprise a step of writing the reservation information on a recording medium of passenger's own when the passenger makes a reservation, and reading the reservation information from the passenger's recording medium when the passenger takes a check-in procedure. As the recording medium, identification cards such as IC card and the like may be used. Such cards can be used either only for reservation of flight or in common with bank cards and credit cards.

When using the recording medium, the reservation information is input to the individual recording medium of a passenger, so that the reservation information can be read out if the passenger having a reservation brings the recording medium when taking a check-in procedure, thereby enabling the effective provision of the identification information to the passenger and his baggage. Specifically, automatically reading from recording medium makes it possible to achieve the third purpose of the invention.

According to the present invention, it is possible to comprise a step of transporting the baggage judged to be of a passenger and to have passed in the baggage security check based on the baggage security check result retrieved at the time of the security check on the passenger.

In this aspect, the baggage checked by a passenger at the check-in procedure is not immediately transported to a sorting section even if passed in a baggage security check and, after the passenger had a security check for himself, based on the baggage security check result retrieved at time of the passenger security check, only the baggage that the passenger owns and passed in the security check is selected and transported to a sorting section of a corresponding flight. The baggage is then loaded on a baggage storage room of an airplane which the passenger is going to board. There is a large possibility that the passenger was subjected to a security check certainly boards a corresponding airplane. Accordingly, only the baggage of such passenger as passed through the passenger security check is actually loaded on an airplane, not needing the discharge of the baggage already loaded on from the airplane. This can achieve the second purpose of the present invention mentioned above.

When the baggage of the passenger includes a rejected one at the security check, the cause of rejection is resolved by the passenger himself before it is transported to a sorting section and loaded on a storage room of a corresponding flight.

To further achieve mainly the above mentioned first purpose, a baggage receiving and handling system in airport to receive passenger's baggage and load the same on an airplane, the system of the present invention comprises memory means for storing identification information of the baggage and a security check result and identification information of the passenger so as to be able to mutually retrieve, informing means for retrieving the baggage security check result stored in the memory means based on the identification information of the passenger at the time of passenger's security check, and informing the security check result of passenger's baggage to the passenger if it includes a rejection, and sorting section for sorting the baggage according to flights, the cause of rejection of which has been removed by the passenger.

In the above baggage receiving and handling system, the identification information provided at the time of a check-in procedure is stored in a memory means with the identification information of a passenger so that both information can refer to each other. The result of a baggage security check is also stored in the memory means so that is can be found based on the identification information of the passenger and the reverse thereof. When the passenger is subjected to a passenger security check, the memory means is referred to based on the identification information of the passenger. If a rejected one is included in the baggage of the passenger, the informing means informs the passenger of the baggage security check result thereby to let the passenger himself remove the cause of rejection. The baggage the rejection to which being dissolved is sorted into a corresponding flight.

The sorting section can sort baggage according to flights, the baggage having passed in the security check and being owned by passengers who finished a passenger security check.

The baggage passed in the security check is not immediately sorted into a flight. After the passenger security check of its owner is finished, the baggage is sorted into and loaded on the storage room of a corresponding airplane. It appears there is a large possibility that the passenger who had a passenger security check boards the airplane. Accordingly, in the present invention, only the baggage of the passenger who passed the passenger security check are intended to load on. Thus, it is possible to save a troublesome operation to discharge the baggage already loaded on an airplane. This can achieve the second purpose of the present invention.

It is preferable to provide a storage section to temporarily store the baggage passed in a baggage security check until the security check on its owner himself is finished.

In this case, the baggage passed in the baggage security check and its owner is not subjected yet to a passenger security check is stored in the storage section. When finishing the security check of the owner himself, his baggage is forwarded to the sorting section and loaded on a baggage storage room of each flight.

The present invention preferably comprises a checking means for providing the identification information whereby to identify a passenger and his baggage to the passenger and the baggage respectively at the time of check-in procedures, and for storing the identification information in the memory means.

The passenger and his baggage can be identified by means of the identification information provided at the time of a check-in procedure and the identification information is retrieved when the passenger himself is subjected to a security check. Accordingly, the baggage rejected at the baggage security check is handled with by the passenger himself to remove the reason of rejection and then forwarded to the sorting section.

Additionally, the present invention comprises reservation means for storing the information of the baggage reported by a passenger when he makes a reservation, and providing reservation information whereby to identify the reservation to the passenger, wherein the checking means providing the identification information based on the reservation information.

In this case, the reservation means provides the reservation information based on report as to the baggage stated by a passenger in making a reservation, so that the checking means can find the reservation information when the passenger having a reservation states the reservation information. This makes it possible to efficiently provide the identification information to the passenger having a reservation.

The checking means of the present invention can compare reservation information reported by a passenger at the time of check-in procedures and the reservation information previously stored in the reservation means, and provide the identification information when both reservation information agree.

Accordingly, when the passenger declares the reservation information in a check-in procedure, the checking means compares the reservation information reported by the passenger and the reservation information stored in advance in the reservation means. If both reservation information correspond to, that is, the passenger coincides with the person reserved, the identification information is provided to the passenger and his baggage.

The reservation means can write the reservation information in recording medium of passenger's own at the time of reservation, and the checking means reads the reservation information from the recording medium at the time of check-in procedures.

The reservation means writes the reservation information in the individual recording medium of the passenger, so that if the passenger brings the recording medium when taking a check-in procedure, the checking means can easily read out the reservation information from the recording medium and effectively provide the identification information. As this recording medium, identification cards such as IC cards and the like may be used, either only for reservation or in common with bank cards and credit cards.

The checking means of the present invention preferably comprises, tag issuing means for issuing a baggage tag recording the identification information when the checking means provides the identification information, and baggage receiving means for receiving baggage attached with the baggage tag, wherein a security check is performed on the baggage received in the baggage receiving means.

When the checking means provides the identification information to the baggage at the time of a check-in procedure, the tag issuing means issues a tag for baggage, the tag recording the identification information of the baggage. Attached with the tag, the baggage becomes acceptable by the baggage receiving means and is subjected to a baggage security check. This can achieve the third purpose mentioned above of the present invention.

In the present invention, it is preferable that the baggage receiving means is forbidden to receive baggage at ordinary times, and is permitted to receive baggage when the tag issuing means issues a baggage tag.

This can prevent the baggage receiving means from receiving the baggage not attached with tags.

To achieve the third purpose mentioned above, the present invention provides a baggage automatic handling apparatus. This baggage automatic handling apparatus can receive baggage according to the baggage receiving and handling method and the associated system.

The baggage automatic handling apparatus for receiving baggage of a passenger who intends to board an airplane can include reservation information memory means for storing boarding information input in advance as reservation information, comparing means for comparing reservation information to be input at the time of baggage check-in procedures and the reservation information stored in the reservation information memory means, tag issuing means for issuing a baggage tag recording the boarding information if both reservation information agree as the result of comparison by the comparing means, and baggage receiving means for receiving the baggage attached with the baggage tag.

According to the above baggage automatic handling apparatus, when a passenger makes a boarding reservation, the reservation information memory means stores the boarding information of the passenger as reservation information, the reservation information including the information of his baggage. When the passenger inputs the reservation information to check his baggage, the comparing means compares the input reservation information with the reservation information stored in advance in the reservation information means. When both information correspond, the tag issuing means issues a baggage tag with the boarding information recorded therein. The passenger puts the tag to the baggage and places the same on the baggage receiving means.

This baggage automatic handling apparatus can be used by connecting with a sorting device to sort baggage according to flights. Also in this case, the baggage received through the automatic handling apparatus without operators is attached with a baggage tag which the boarding information is recorded in, so that easy sorting of baggage into each flight can be achieved by the sorting device. The tag issuing means for issuing baggage tags may also be used as a boarding pass issuing means for issuing a boarding pass to passenger.

The automatic baggage managing apparatus in the present invention further comprises reading means for reading the reservation information recorded in a recording medium which a passenger brings with him at the time of baggage check-in procedures, wherein the comparing means compares the reservation information read by the reading means and the reservation information stored in the reservation information means.

In this baggage automatic handling apparatus according to the present invention, when a passenger brings a recording medium such as IC card, the reading means reads the information stored in the recording medium to input the information of the passenger. The comparing means accordingly makes a comparison between the information read by the reading means and the boarding information stored in the reservation information memory means.

The baggage receiving means, can include forbidding means forbidding means to forbid the baggage receiving means to receive baggage, and control means for driving the forbidding means to forbid the baggage receiving means to receive baggage at ordinary times and to permit the same to receive baggage when the tag issuing means issues a baggage tag.

In this baggage automatic handling apparatus, the control means usually controls the forbidding means to forbid to receive baggage, because the baggage not attached with a tag or its owner not being a passenger is prevented from being inserted in the baggage receiving means. When the tag issuing means issues a tag, the control means to control the forbidding means to remove the forbidden state, the receiving means can receive the baggage attached with a tag. As the forbidding means, a door and a shutter opening and closing an entrance port of the baggage receiving means may be used. A message display may be applied to inform of inhibition of inserting baggage into the baggage receiving means.

The baggage receiving means of the baggage automatic handling apparatus according to the present invention may comprise a tag reader to read a baggage tag attached to the baggage inserted therein, completion judging means to judge whether all pieces of baggage of the passenger have been checked or not, based on the information read by the tag reader, wherein the control means may control the forbidding means to forbid the reception of baggage when the completion judging means judges passenger's baggage is completely checked.

When baggage is inserted in the baggage receiving means mentioned above, the tag reader reads the tag attached to the baggage to supply the information to the completion judging means. The judging means judging that all pieces of baggage of a passenger have been received based on the information supplied by the tag reader, the control means controls the forbidding means to forbid again the reception of baggage, thus preventing any goods from being inserted in the baggage receiving means until the next passenger starts taking a check-in procedure.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of baggage receiving and handling method, its system, and a baggage automatic receiving apparatus embodying the present invention will now be given referring to the accompanying drawings.

Figure 1:
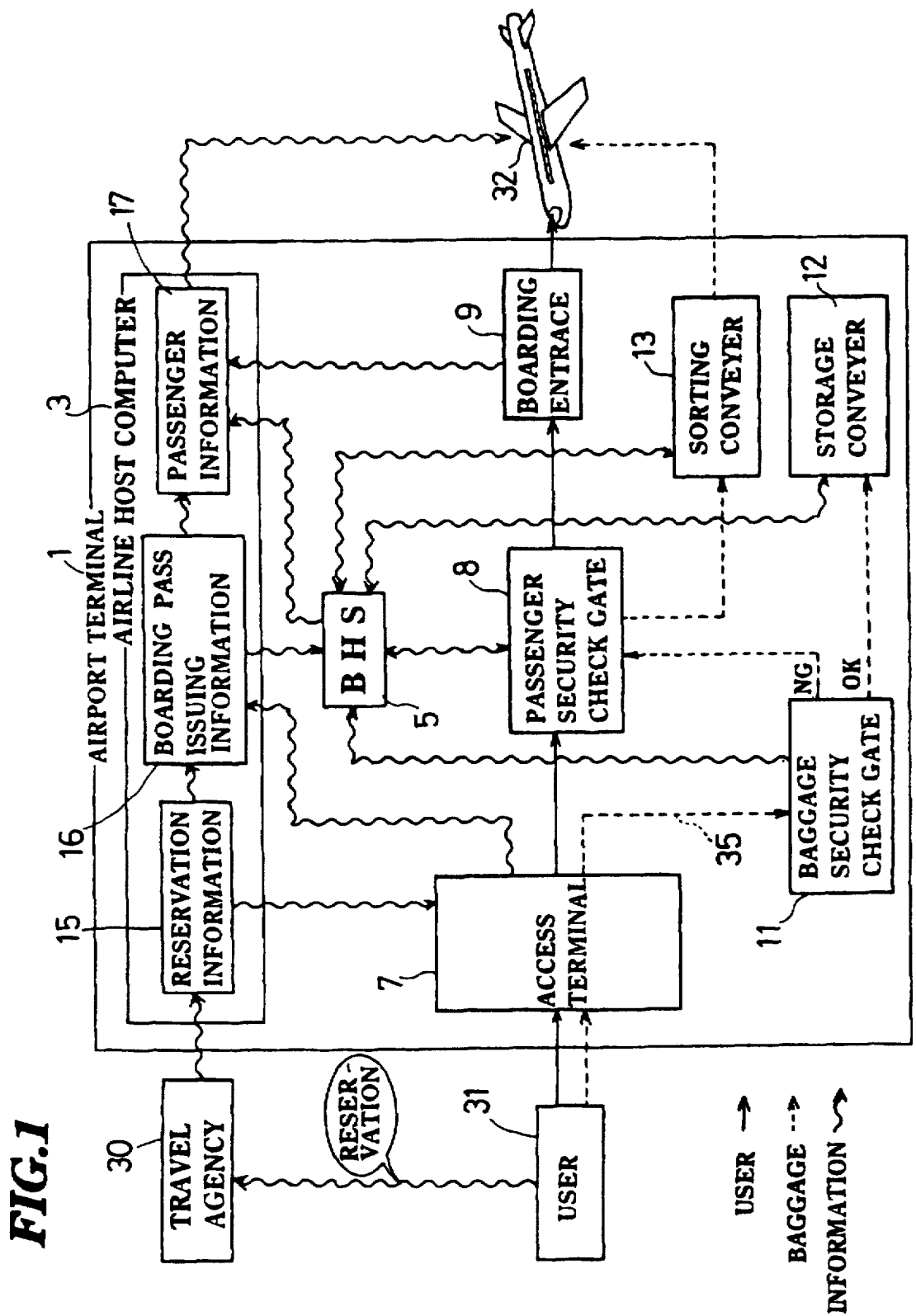
FIG. 1 is a general view showing an airport system in the embodiment according to the present invention.

FIG. 1 shows a general view of an airport system to carry out a baggage receiving and handling method in an embodiment according to the present invention.

This airport system is provided, within the airport terminal 1, with a host computer 3 for an airline company, a baggage handling system 5, hereinafter called BHS, an access terminal 7, a security check gate 8 for passenger, a boarding entrance 9, a security check gate 11 which is for baggage, a storage conveyer 12 and a sorting conveyer 13. The airport system has travel agency outside of the airport terminal 1.

The airline host computer 3 is for managing the reservation of seat in flights that airlines serving and the information of passengers and the like, and contains a reservation information file 15, a boarding pass issuing information file 16, and a passenger information file 17. The reservation information file 15 is for recording the contents of the reservation received via the travel agency 30 and others. The boarding pass issuing information file 16 is for recording the information of a boarding pass issued to a user 31 at the access terminal 7. The passenger information file 17 is to record the information of the passenger who went through the boarding entrance 9, the passenger being herein the user 31 passed through the access terminal 7, and the information of the baggage passed the sorting conveyer 13.

In FIG. 1, only one airline host computer 3 is shown, but airline companies in an airport each have individually a host computer.

Figure 2:
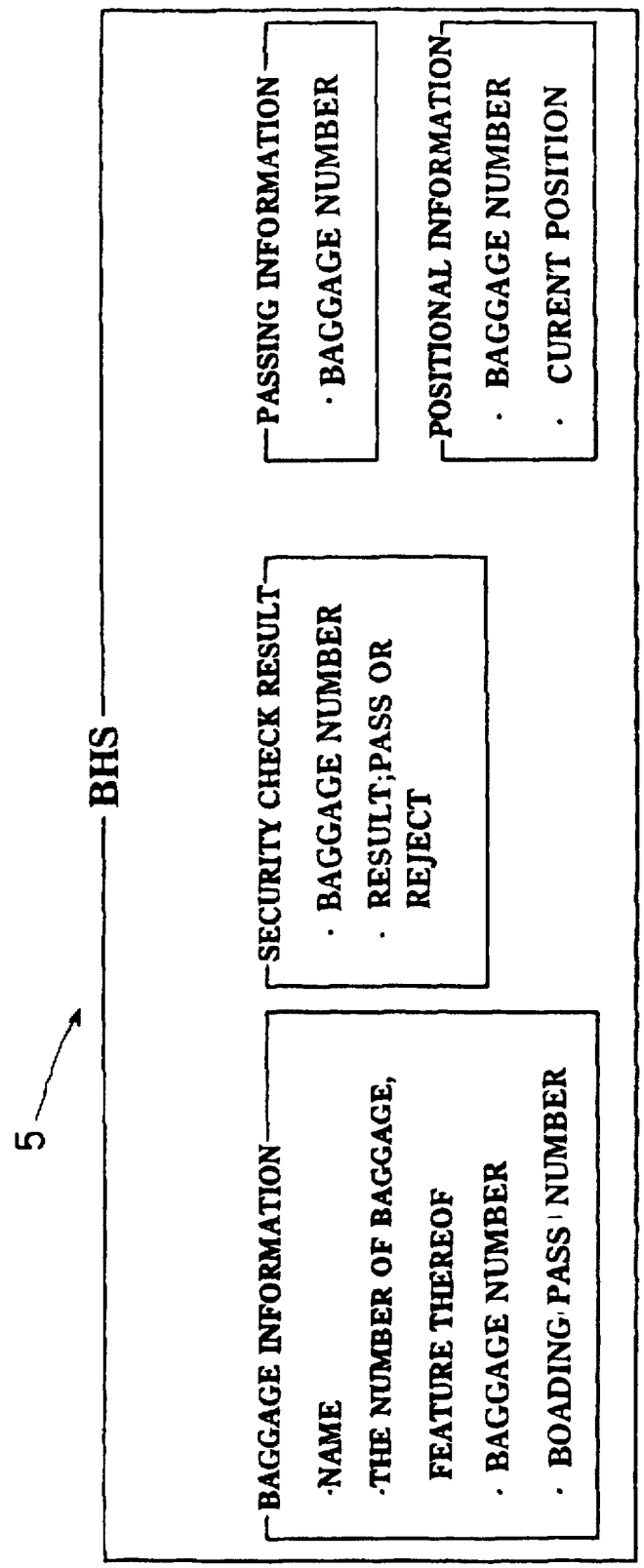
FIG. 2 is a block view of a baggage handling system of FIG. 1.

The BHS 5 is a host computer for controlling handling of baggage brought in the airport by the user 31 until the baggage is loaded on an airplane. As shown in FIG. 2, the BHS 5 includes memory areas for four kinds of information: baggage information, security check result, passage information and position information, each of which will in detail be described hereinafter.

The baggage information is in relation to the baggage of passengers of each flight, including passenger's name, the number of baggage of the passenger, and the distinctive features of the baggage and the like. The security check result includes the result of the security check of the baggage at the security check gate 11, that is, pass or reject. The passage information is the information to judge whether the baggage checked at the security check gate 11 may be sorted into a corresponding airplane, and whether the passenger being owner of the baggage has gone through the security check gate 8. The position information is in relation to the current position of the baggage.

Memory means specified in claim 5 corresponds to the BHS 5.

This BHS 5 is a system of an airport and is used in common by airline companies standing in the airport as well as the access terminal 7, the security check gates 8 and 11, the boarding entrance 9, the storage conveyer 12, and the sorting conveyer 13.

The access terminal 7 is a computer terminal where the user 31 who arrived in an airport takes a check-in procedure, having a function of issuing a boarding pass for the user 31 and a tag to be attached to his baggage. This tag is provided with an identification number, which may include not only numerals but also letters and symbols, thereby enabling to mutually retrieve the identification number of a boarding pass.

Between the access terminal 7 and the baggage security check gate 11 installed is a transport conveyer 35 for automatically transporting the baggage attached with a tag, separated from the user 31. Consequently, separating the baggage from the user, this makes it possible for him to easily take later boarding procedures such as a security check of the user himself and others.

The access terminal 7 is disposed at a main floor in an airport. The main floor is commonly considered as a floor provided with a security check gate 8 and a boarding entrance 9 and located in the same floor as bus stops and taxi stands in the airport. In addition, the access terminal 7 may be installed in a parking lot and a rail station attached to the airport to attempt conveniences of users.

The access terminal 7 is supplied the information of reservations recorded in the reservation information file 15 from the airline host computer 3, and transmits the information of a boarding pass issued for a passenger and of the baggage checked to a host computer 3 corresponding to an airline company. The host computer 3 stores the information in the boarding pass issuing information file 16.

The security check gate 8 is an equipment to make a security check on a passenger, specifically, to inspect whether a passenger brings any goods forbidden to carry into an airplane such as dangerous objects. Besides the inspection, the security check gate 8 has functions to indicate a security check result of baggage to its owner, i.e., a passenger, and to transmit a signal representing that a security check on the passenger is over to the BHS 5.

The boarding entrance 9 is a gate through which the passenger after passed through the security check gate 8 actually goes to board an airplane 32, which is installed at each arrival and departure platform according to airplanes.

The boarding entrance 9 reports that the passenger passed therethrough to the airline host computer 3. In the case of arrival and departure platforms for international flights, not shown in FIG. 1, a passport control counter is arranged between the passenger security check gate 8 and the boarding entrance 9.

The security check gate 11 for baggage is an equipment for examining the baggage separated from its owner at the access terminal 7, whether the baggage includes dangerous objects and other goods forbidden to bring into airplane. This security check gate 11 is connected to the access terminal 7 through an automatic transport conveyer 35 so that the baggage checked at the access terminal 7 is carried automatically to the security check gate 11. On finishing the security check on a passenger at the security check gate 11, the result thereof are transmitted to and then stored in the BHS 5.

The storage conveyer 12 is a conveyer to temporarily store the baggage passed the security check at the security check gate 11 and to forward only the baggage that its owner passed through the security check gate 8 toward the sorting conveyer 13 connected with the storage conveyer 12. The sorting conveyer 13 is for sorting the baggage forwarded from the storage conveyer 12 according to flights.

At the sorting conveyer 13, the baggage to be loaded on the flight that there is only a predetermined time to the departure time is transported to the corresponding airplane 32. The storage conveyer 12 and the sorting conveyer 13 receive instructions respectively from the BHS 5 and transmit the information of each current position of baggage to the BHS 5.

The travel agency 30 serves as a counter to receive a reservation from a user 31, and also has a function to transmit the reservation data to the airline host computer 3. Then, the host computer 3 stores it in the reservation information file 15.

Figure 3:
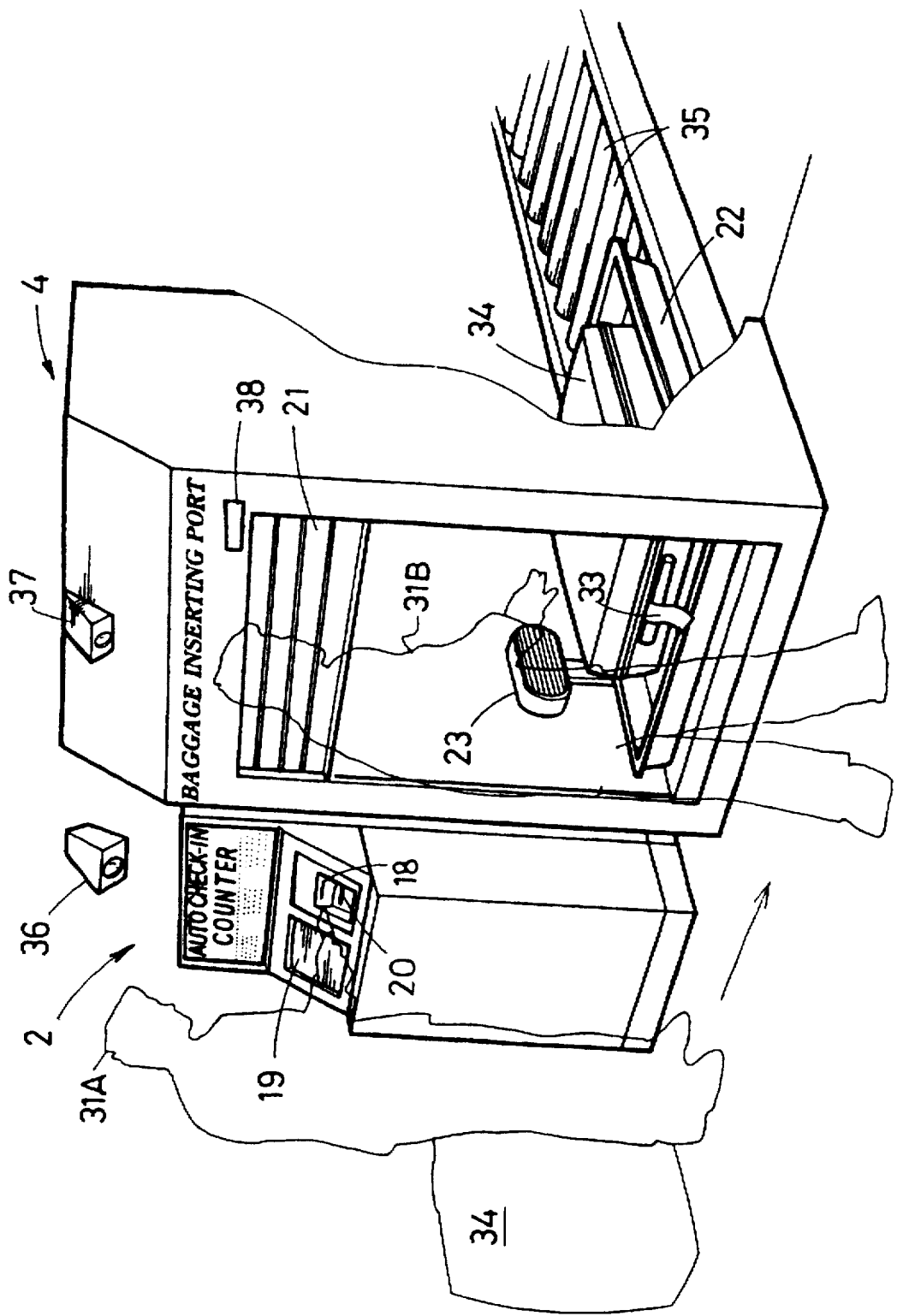
FIG. 3 is a schematic view of an external appearance of a baggage automatic handling apparatus in the embodiment.

The access terminal 7 will hereinafter be described in more detail. In the access terminal 7 is equipped an automatic baggage handling device shown in FIG. 3. This automatic handling device 3 is mainly composed of an automatic check-in counter unit 2 with which a user 31A takes first check-in procedures and a baggage inserting unit 4 through which a user 31B checks baggage 34 attached with a tag 33, both units being disposed side by side. The user 31B is a person who already finished the check-in procedures with 30 the automatic check-in counter unit 2 and received a boarding pass and a tag 33 respectively issued by the unit 2.

The automatic check-in counter unit 2 is provided with a card insertion port 18 to which the user 31A inserts his IC card, a screen 19 for displaying instructions to operate the unit 2 for the user 31A, and an output port 20 for putting out a boarding pass and a tag to the user 31A. The surface of the screen 19 is formed of a touch panel (membrane switch) with which the user 31A can easily input the necessary information in response to instructions displayed on the screen 19.

The baggage inserting unit 4 is provided, on its front wall, with an opening and closing gate 21 and a message display 38 and, inside of the gate 21, with a table 22 which the baggage is put on, and a detector 23 for finding the size of the baggage put on the table 22 and reading the tag attached to the baggage. The table 22 has a function of detecting the weight of the baggage put thereon. On the lower surface of the inside of the baggage inserting unit 4 is equipped a transport conveyer 35 extending to and connecting with the security check gate 11 for baggage later mentioned. On respective upper parts of the automatic check-in counter unit 2 and the baggage reception unit 4, monitor cameras 36 and 37 are attached in order to confirm whether users 31A and 31B correspond to the persons themselves.

Figure 4:
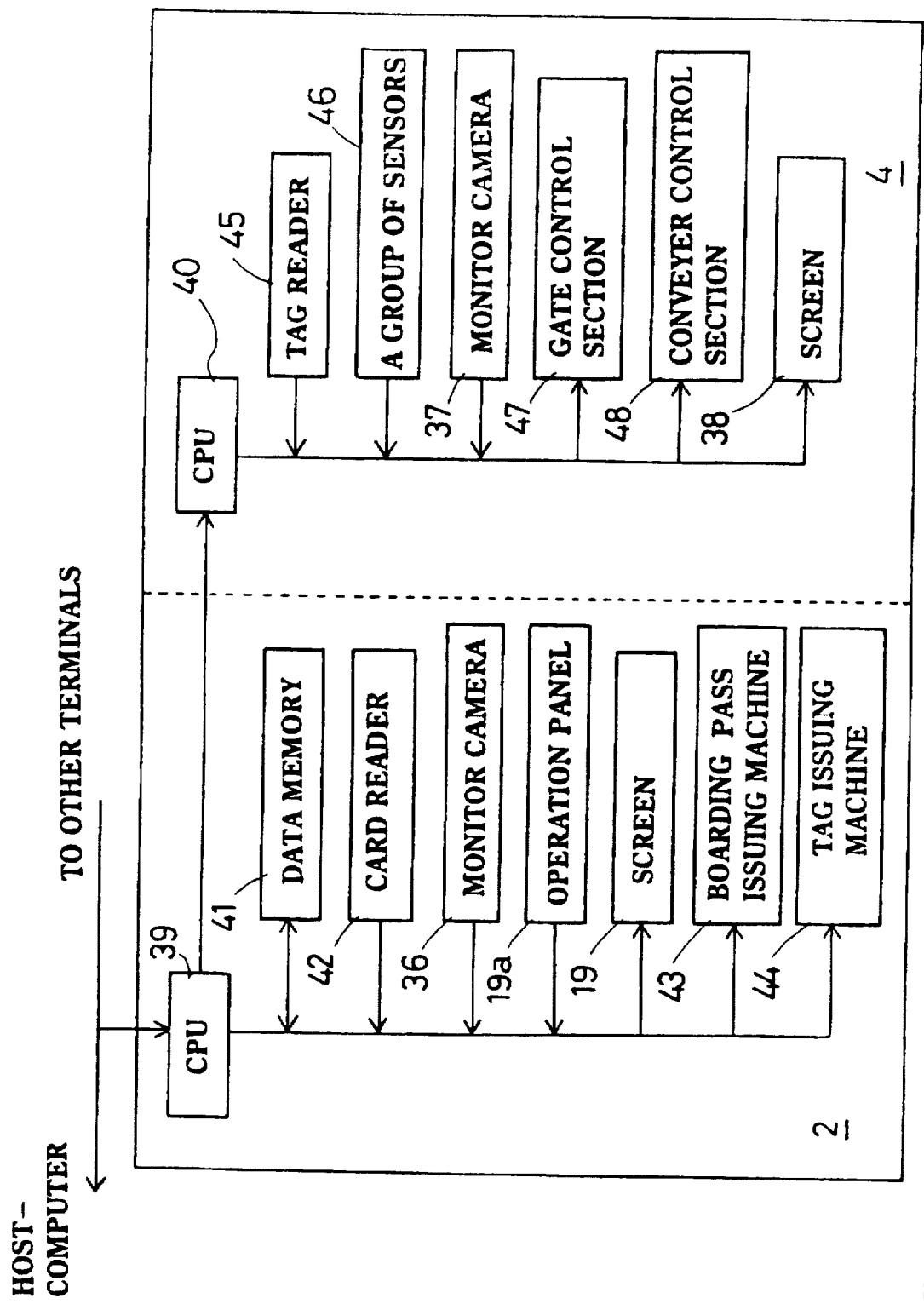
FIG. 4 is a block view of a control system of the baggage automatic handling apparatus.

The control system of the above mentioned baggage automatic handling apparatus is shown in FIG. 4 as a block diagram. In the baggage automatic handling system, the auto check-in counter unit 2 and the baggage inserting unit 4 are provided with central processing units (CPUs) 39 an 40 respectively.

The automatic check-in counter unit 2 further includes a data memory 41 for storing reservation data provided from the airline host computer 3, a card reader 42 for reading an IC card inserted into the card insertion port 18, a monitor camera 36, an operation panel 19a, a screen 19, a boarding pass issuing machine 43, and a tag issuing machine 44, all of which are connected individually to the CPU 39 linked with the airline host computer 3.

The operation panel 19a is a touch panel forming the surface of the screen 19 as described above. With the automatic check-in counter unit 2, a boarding pass issued at the boarding pass issuing machine 43 and a tag 33 issued at the tag issuing machine 44 are output from the output port 20 to the user 31A.

In the baggage inserting unit 4 contained are a tag reader 45 for reading a tag attached to the baggage put into the inserting unit 4, a group of sensors 46 for detecting the size and the weight of the baggage, a monitor camera 37, a gate control section 47 for controlling opening and closing operation of the gate 21, a conveyer control section 48 for controlling the transport conveyer 35 to drive, and an indication display 38, all of which are connected to the CPU 40. In the group of sensors 46, a size sensor is built in the detector 23 as well as the tag reader 45 is and a weight sensor is in the table 22.

The flow from a reservation of a flight by a user 31 to boarding of the user and loading of his baggage on the flight will be described hereinafter, watching each movement of the user, the baggage, and the information.

The user 31 first makes a reservation of flight at a travel agency 30. This reservation can be done by way of common methods, for example, by telephone or his direct coming to the travel agency 30. It is however preferable to use an identification card such as IC card if the user 31 has. When reserving, the user 31 declares his name, his requesting flight number, class thereof, and IC card's number if he uses it, and the user 31 may add the information of baggage which he is going to bring in the flight, for example, the number of baggage and its size. When the reservation is accepted, a boarding pass on which the reservation data are recorded is issued for the user 31. In the case that an IC card is used for reservation, the reservation data are recorded in the IC card instead of issuing a boarding pass. The reservation data are transmitted from the travel agency 30 to a corresponding airline host computer 3 installed in the airport terminal 1 and stored in the reservation information file 15. The reservation data are also transmitted to the baggage automatic handling apparatus shown in FIG. 3 placed at the access terminal 7 and stored in the data memory 41.

When arriving in the airport terminal 1, the user 31 takes a check-in procedure at first at the access terminal 7. Access terminals 7 are installed in various places besides a main floor, for example, a parking floor and a rail station attached to the airport. Accordingly, the user 31 can early leave his baggage with the baggage automatic handling apparatus if taking a check-in procedure on arriving in the airport, reducing labor to carry about baggage in the airport.

Figure 5:
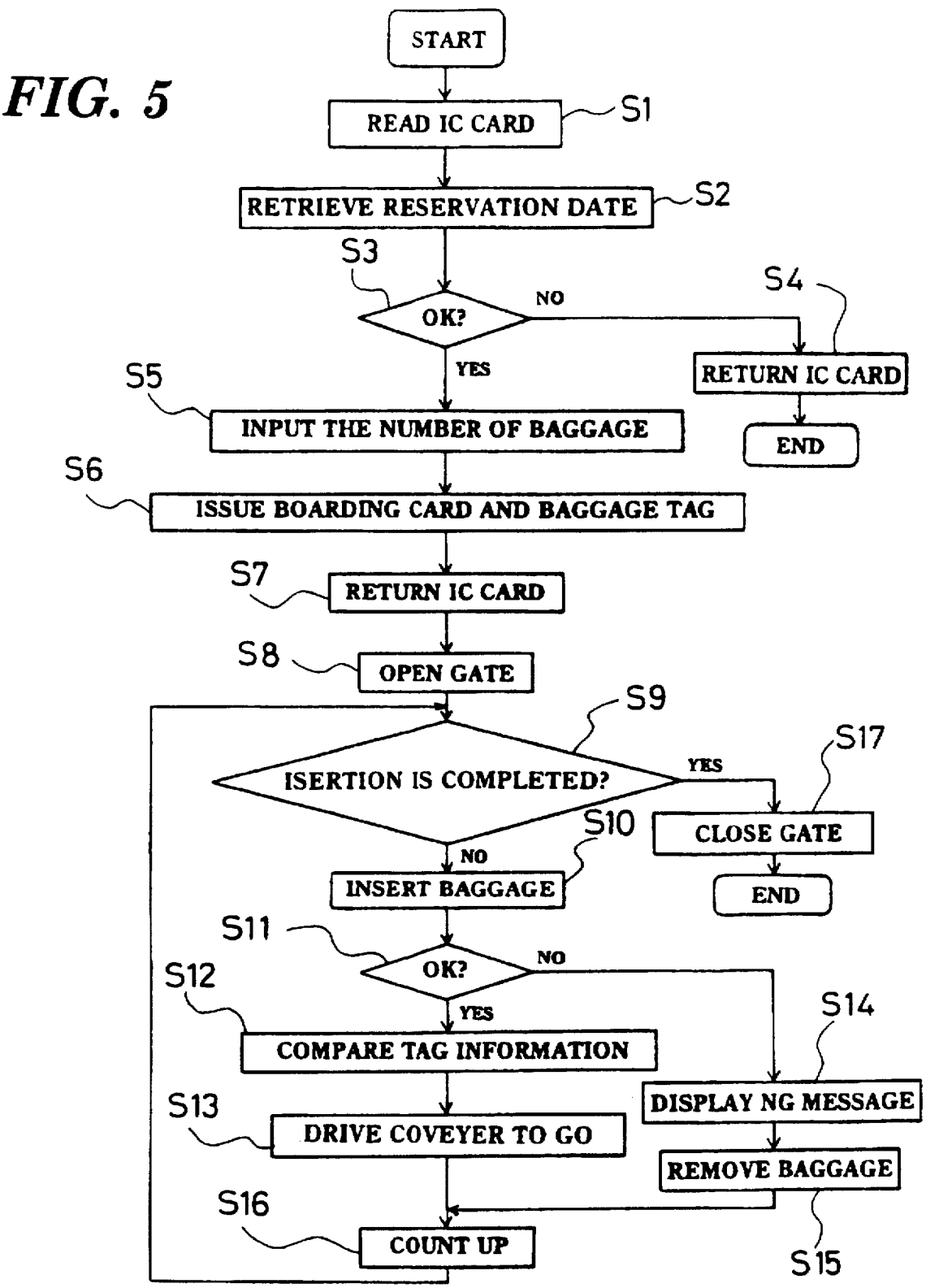
FIG. 5 is a flow chart to explain the steps of receiving and handling baggage by the baggage automatic handling apparatus.

More specifically, in the automatic baggage handling apparatus at the access terminal 7, the user 31 first takes a check-in operation with the automatic check-in counter unit 2 and then puts his baggage into the baggage reception unit 4. FIG. 5 shows a flow chart to show the case that the user 31 had a reservation by using an IC card. When the user 31A inserts his IC card into the card insertion port 18, the card reader 42 leads the IC card therein to read the identification number recorded in the IC card (S1) and transmits the identification number to the CPU 39. The CPU 39 refers to the data memory 41 based on the identification number (S2) to judge whether a corresponding reservation data is therein (S3). At the same time, the monitor camera 36 makes a confirmation of the user 31A himself.

If there is no corresponding reservation data (S3: No), the IC card is returned back to the user 31A (S4), finishing this managing process. As judged that the user 31A has no reservation, he must retake a check-in procedure at another check-in counter with an operator.

If a corresponding reservation data is found (S3: Yes), alternatively, the reservation data are displayed on the screen 19. The user 31A can confirm the reserved contents as displayed on the screen 19 accordingly. When the display on the screen 19 is changed to a mode to input the number of baggage and others, the user 31A inputs the number of baggage, etc. in accordance with instructions displayed on the screen 19 (S5). It is unnecessary for users to input anything if there is no change from the number of baggage declared in reserving. If not declared the number of baggage at the time of reservation, or changes the same, the user is needed to input the actual number of baggage. This input operation is made by user's finger directly pushing the screen 19. Besides displaying on a screen as mentioned, instructions to operate for users may be made by means of an instruction means using sound.

When the user finishes inputting the number of baggage, the boarding pass issuing machine 43 issues a boarding pass and the tag issuing machine 44 issues a tag 33 (S6). The number of tags issued is equal to the number input at a step 5. This boarding pass and the tag 33 are taken out from the port 20 so that the user 31A can get them. This boarding pass is given the identification number capable of identifying the user 31A. Each tag 33 issued is given the identification number whereby to identify the baggage. Those identification numbers given in a boarding pass and tags can retrieve reciprocally.

Consequently, if the identification number of a user is identified, the identification number of his baggage can be output and, in reverse, if the identification number of baggage, the identification number of a user being owner of the baggage can be output. In addition, those identification numbers can reciprocally retrieve the number of an IC card of the user. In other words, the passenger identification information and the baggage identification information, and preferably the IC card identification information as well, are cross-referenced with one another.

At this time, the identification number of the boarding pass, the number of tags issued and their identification numbers are transmitted from the CPU 39 to the CPU 40 and the data relating to the user 31A are deleted from the data memory 41. The above identification numbers and others are also transmitted to the airline host computer 3 to store in the boarding pass issuing information file 16. The information stored includes the name of a user who took a check-in procedure, the flight number that the user is going to get board on, his seat number, the identification number of his boarding pass, the number of his baggage and their identification numbers.

When the IC card is returned back to the user 31A (S7), the procedure by the user with the automatic check-in counter unit 2 is finished and then the user moves to the baggage reception unit 4 placed adjacently to the automatic check-in counter unit 2. Here, if the number of baggage input at a step S5 is zero, all check-in procedures are finished, so that the user 31A with a boarding pass can go toward the security check gate 8 for passengers. After a step S7, the automatic check-in counter unit 2 can process check-in procedures for the next user while the baggage inserting unit 4 is in process of a step S8 and subsequent steps.

When the user having baggage moves to the baggage inserting unit 4, on confirming through the monitor camera 37 monitoring the user standing at a front thereof, the CPU 40 controls the gate control section 47 to open the opening and closing gate 21 (S8). The gate 21 is usually kept closed in order to prevent goods except passenger's baggage from being put into the baggage inserting unit 4 without permission. On opening the gate 21, the CPU 40 judges whether all user's baggage have been inserted in the baggage inserting unit 4 (S9) by comparing the number of baggage with the number of issued tags transmitted from the CPU 39. Namely, it is judged as "No" if the number of baggage already inserted does not reach the number of issued tags and as "Yes" if the number of baggage inserted reaches the number of issued tags.

When the gate 21 is just opened, the CPU 40 provides a judgement as "No" and processes a step S10 and the following. At first, the user 31B attaches a tag 33 to a baggage 34 and puts the baggage 34 on a table 22 disposed inside of the opening and closing gate 21 (S10). The size sensor contained in the detector 23 and the weight sensor contained in the table 22 detect the size and weight of the baggage 34 respectively, judging whether the baggage 34 is within a predetermined size limit and weight limit (S11). If the size and weight conditions are satisfied (S11: Yes), the built-in tag reader 45 in the detector 23 reads the identification number of the tag 33 to compare with the identification number transmitted from the CPU 39 (S12), confirming the baggage 34 put on the table 22 is surely of the user 31B. After this confirmation, the conveyer control section 48 drives the transport conveyer 35 to go (S13), forwarding the baggage 34 to the security check gate 11 for baggage.

The CPU 40 then counts up the number of baggage already inserted in the inserting unit 4 (S16) and judges again whether it equals to the number of issued tags (S9). If it is judged that it does not equal to (S9: No), the steps from S10 to S16 are repeatedly conducted for the remaining baggage. If it equals (S9: Yes), the CPU 40 controls the gate control section 47 to close the gate 21 (S17), completing the baggage receiving procedure. After that, the user being passenger can go toward the security check gate 8 without carrying about the baggage 34. This makes it possible for passengers to release from baggage excepting such small bags that can be stowed under the seats of airplanes.

At a step S11, if it is judged that the baggage 34 put on the table 22 is beyond the size and weight limits (S11: No), a message informing of the baggage being not acceptable is displayed on the message display 38 (S14). The user 31B looking the message must remove the baggage 34 from the table 22 (S15). In order to instruct a user to remove the baggage 34, not only a message displayed on the screen 38, but also voice by alarming means can be used.

The user who reserved without using an IC card also takes almost the same procedures as above except that a flight ticket is used to read the reservation data instead of IC card at the step S1. Different from the case of IC card, the airline ticket is collected in the baggage automatic check-in counter unit 2 without returning back to a user.

The baggage automatically transported from the access terminal 7 to the baggage security check gate 11 is subjected to the security check immediately to examine whether the baggage contains goods forbidden to bring in airplane, such as dangerous objects. The baggage passed the security check is forwarded to the storage conveyer 12, while the baggage rejected is kept there as it is. The security check result is transmitted to the BHS 5 and is stored as the individual result according to baggage's identification number. The baggage transported to the storage conveyer 12 is temporarily stored there till after the passenger finishes a security check for himself. The storage conveyer 12 transmits the number of the baggage transported from the access terminal 7 to the BHS 5. This BHS 5 records it as the current positional information of the baggage.

On the other hand, after finished the check-in procedure at the access terminal 7, the passenger is subject himself to a security check at the security check gate 8 to examine whether the passenger has any goods on his person which are forbidden on an airplane, such as a dangerous goods and the like. The security check gate 8 also provides an indication of the security check result of baggage to its owner passing through the gate 8.

Generally, passengers may utilize restaurants, shops and others located in the airport after the check-in procedure at the access terminal 7 and before a security check for himself.

Figure 6:
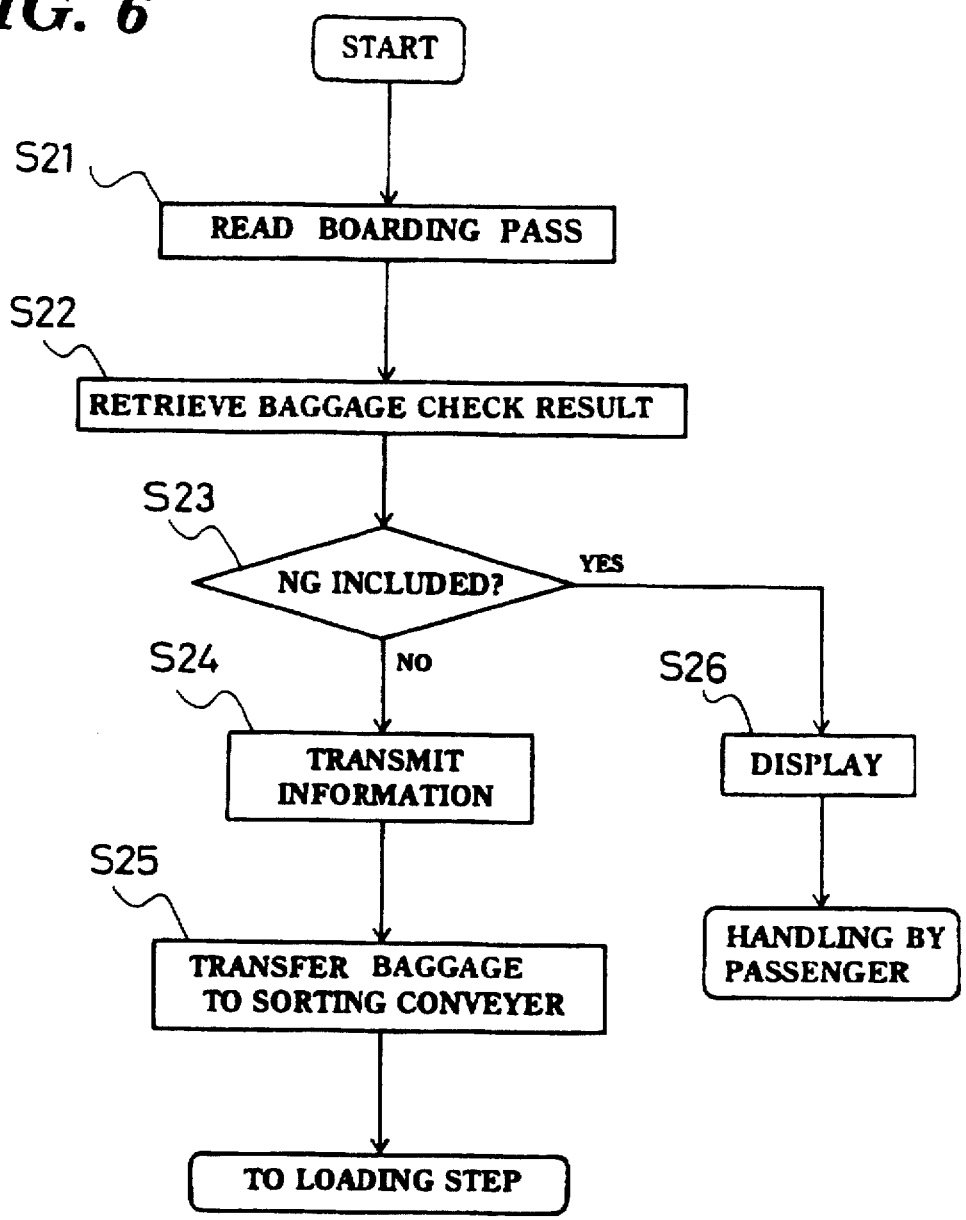
FIG. 6 is a flow chart to explain the steps of a passenger taking at a security check gate.
Figure 7:
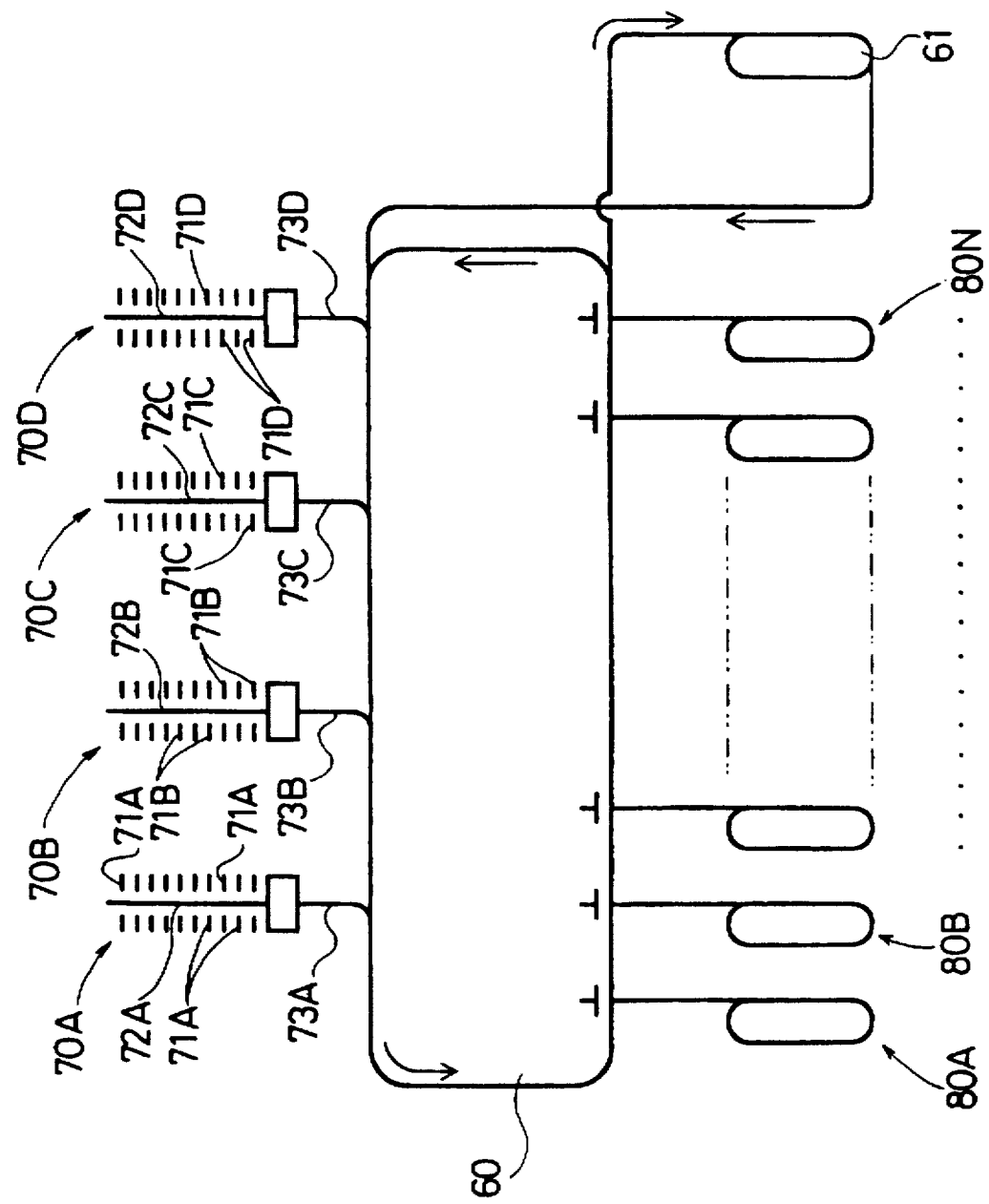
FIG. 7 is a schematic view of a baggage receiving and handling system in a prior art.

Processing in the security check gate 8 will hereinafter be described in detail in reference to FIG. 6.

When a passenger arrives at the security check gate 8, his boarding pass is read (S21) to identify the passenger by the identification number recorded in the boarding pass. The security check gate 8 is supplied with record data of the boarding pass issuing information 16 via the BHS 5 from the airline host computer 3. Then a security check on the passenger starts.

Simultaneously, the security check gate 8, based on the passenger's identification number read from the boarding pass at a step S21, accesses to the BHS 5 to find the identification numbers of baggage of the passenger and the security check results thereof (S22). The security check results are informed to that passenger. The following processes depend on the security check results, i.e., whether it includes any rejection (S23).

If no rejection (S23: No), that result is informed to the passenger and the information of passenger's security check being over is transmitted to the BHS 5 (S24). This information is then transmitted to the storage conveyer 12, to transfer all the baggage of the passenger from the conveyer 12 to the sorting conveyer 13 (S25). The information of the completion of the passenger's security check is recorded as a passing information in the BHS 5 with the identification number of the baggage. This information is also transmitted to the airline host computer 3 and stored in the boarding information file 17.

If the security check result retrieved at a step S22 includes a rejection (S23: Yes), the result and the identification number of the rejected baggage are displayed on the message display 38 (S26), whereby to inform the passenger thereof. In this case, the passenger himself removes the cause of rejection by removing a forbidden good out of the baggage. This baggage is put on the sorting conveyer 13. Other baggage of the passenger passed in the baggage security check are transferred to the sorting conveyer 13 after the information of passenger's security check completion is transmitted to the conveyer 12 in accordance with the same way as a step S25.

If transferring baggage from the storage conveyer 12 to the sorting conveyer 13 and loading the baggage which the cause of rejection is removed from on the sorting conveyer 13, the number of the baggage is transmitted to the BHS 5 thereby to correct the current positional information of the baggage.

The processes described above and shown in FIG. 6 are performed based on the following reason.

At first, mentioned is the reason to inform a passenger passing through the passenger security check gate 8 of his baggage being rejected at a baggage security check, without immediately paging him. This is because passengers may utilize shops and restaurants in the airport after check-in procedures at the access terminal 7 and before security check at the security check gate 8, a passenger does not always appear soon in response to the paging in such a period of time. However, a passenger always passes through the security check gate 8. It is accordingly possible to effectively handle the baggage if making the passenger handle the rejected baggage when he passes through the security check gate 8.

Next, the reason to transfer the baggage from the storage conveyer 12 to the sorting conveyer 13 after a passenger being owner of the baggage passed through the passenger security check gate 8 is to prevent the baggage of a person who does not board an airplane from being loaded on the airplane. Passengers must have security check for themselves at the security check gate 8 prior to boarding airplanes and almost all the passengers passed through the gate 8 shall actually board each corresponding airplane. Thus, this passing of a passenger through the gate 8 is used as a signal to permit his baggage to be loaded on the airplane.

The passenger passed through the security check 8 succeedingly goes through a boarding entrance 9 in a corresponding departure platform to board an airplane 32. At this boarding entrance 9, the number of the boarding pass of the passenger is read and transmitted to the airline host computer 3. The host computer 3 puts a flag representing that the passenger has boarded the airplane on the number of his boarding pass recorded in the passenger information file 17. In the case of international flight, between the security check gate 8 and the boarding entrance 9, a passenger takes a departure check at a passport control desk.

On the other hand, the baggage passed in the security check are transferred to the sorting conveyer 13 when its owner passed through the security check gate 8, and the baggage rejected in the security check are put on the sorting conveyer 13 after the cause of rejection is removed by the owner himself. At the sorting conveyer 13, the baggage to be loaded on the airplane that a remaining time before a departure time becomes less than a predetermined time, for example, 30 or 60 minutes, are loaded on a corresponding one of transporting cars arranged at each departure platform. The transporting car carries the baggage to an port of a baggage storage room of the airplane 32 standing in the departure platform. The baggage are loaded thereon.

The sorting conveyer 13 transmits the information of the number of the baggage and the flight when the baggage is put on the transporting car to the BHS 5. The BHS 5 corrects the positional information of the baggage and transmits it to the airline host computer 3. The airline host computer 3 puts a flag representing the loading completion on the number of the baggage recorded on the passenger information file 17. When all boarding pass numbers and baggage numbers recorded in the passenger information file 17 for the flight are checked with flags, representing the completion of boarding or loading, the airline host computer 3 transmits the information of the airplane 32 being ready for departure to the airplane 32. This airplane 32 can accordingly take off.

As mentioned in the above embodiment, the baggage is provided with an identification number at the access terminal 7 and the identification number is recorded in the boarding pass issuing information file 16 in the airline host computer 3, so that the baggage number can be found in reference to a boarding pass number of a passenger when he passes through the security check gate 8 and the baggage security check result is informed to the passenger being owner of the baggage.

If the baggage security check result include any rejection, the passenger can handle the rejected baggage to dissolve the rejection thereon. Consequently, even if baggage is rejected at the time of the baggage security check, it is unnecessary to immediately page the passenger being owner of the rejected baggage through a public-address system in the airport, who might visit shops or restaurants in the airport. In this way, indicating the baggage security check result to their owner and handling a rejected baggage can effectively conducted.

In the present invention, the baggage passed in the security check is transferred from the storage conveyer 12 to the sorting conveyer 13 after the passenger being owner of the baggage passed through the security check gate 8 and, alternately, the baggage rejected is put on the sorting conveyer 13 after the passenger himself dissolved the rejection to the baggage, so that the baggage put on the sorting conveyer 13 is only of the passengers passed through the security check gate 8. Because there is a large possibility of such passengers as passed through the security check gate 8, almost all, actually boarding an airplane, goods or baggage not owned by the passengers boarding the airplane 32 can be prevented from being loaded on the airplane 32 by error.

In the embodiment of the present invention, at the access terminal 7, installed is a baggage automatic handling apparatus provided with an automatic check-in counter unit 2 and a baggage inserting unit 4, where reservation data is stored in a data memory 41 of the automatic check-in counter unit 2 and retrieved by that a card reader 42 reads the number of passenger's IC card. Accordingly, if a user who previously reserved using the IC card number comes in an airport with the IC card, the automatic handling apparatus can rapidly process to confirm reservation and the person himself and to issue a boarding pass and baggage tags needed.

Furthermore, before being inserted in the baggage inserting unit 4, baggage is attached with a tag provided with an identification number that can be retrieved. This makes it possible to effectively inform of the baggage security check result to its owner and sort the baggage in later steps.

The baggage inserting unit 4 closes the gate 21 in a common state, opens it when a passenger completes a check-in procedure with the automatic check-in counter unit 2 and closes again as soon as finishes accepting all the baggage of the passenger, so that goods or baggage not owned by the corresponding passenger can be prevented from being entered in the baggage inserting unit 4. The baggage inserting unit 4 is also equipped with a tag reader 45 for reading the tag attached to the baggage entered therein and a group of sensors for detecting the size and weight of the baggage, thereby to accept only baggage fulfilling conditions of size and weight.

As the baggage inserting unit 4 is connected to the baggage security check gate 11 by the transporting conveyer 35, the baggage accepted in the inserting unit 4 is automatically transported to the security check gate 11, leaving from a passenger. In addition, the baggage automatic handling apparatus is equipped in the access terminal 7 which is located at each important place in an airport, for example, a main floor, bus stops, and a rail station. If taking a check-in procedure on arriving in the airport, accordingly, a passenger can early be leave his baggage.

Since the automatic check-in counter unit 2 and the baggage inserting unit 4 contain CPUs 39 ad 40 respectively, while a passenger who finished a procedure in the unit 2 is taking the following procedures for his baggage in the baggage inserting unit 4, the next passenger can take a check-in procedure in the automatic check-in counter unit 2.

The present invention may be embodied in other specific forms without departing from the spirit or essential characteristics thereof. For instance, in the above embodiment, a user makes a reservation and a check-in with an IC card which an identification number is recorded in. Instead of such IC cards, a user may use a magnetic card or a photo-recording card. Those cards are not needed to be only for an airport system and may be used in common with a bank card or credit card. It is further possible to construct the automatic check-in counter unit 2 so that not only a user who made a reservation before coming to an airport but also other user having no reservation can take a check-in procedure in the automatic check-in counter unit 2.

Described above is the handling process only for baggage of the passengers who are going to leave by airplane from an airport, it is also possible to include in combination therewith the handling process for other baggage of the passengers who are landing by airplane or changing airplanes in the airport.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An airport baggage receiving and handling method to receive a passenger's baggage, to identify the baggage and to process the baggage for the passenger's flight, the method comprising the steps of:

providing identification information to identify the passenger, the baggage and the passenger and the baggage with respect to each other, when the passenger undergoes a check-in procedure;

storing a result of a baggage security check on the baggage;

retrieving the baggage security check result based on the identification information of the passenger at the time of a passenger security check on the passenger;

conveying the baggage security check result to the passenger, and if the baggage security check result is a rejection, permitting the passenger to overcome the rejection; and forwarding the baggage that has passed the baggage security check to a sorting section.

2. The baggage receiving and handling method according to claim 1, further comprising the steps of:

storing baggage information reported by a passenger when he makes a reservation, and providing reservation information to identify the reservation; and retrieving the baggage information based on the reservation information and outputting said identification information for the passenger and his baggage.

3. The baggage receiving and handling method according to claim 1, further comprising the steps of:

entering reservation information on a passenger recording medium of the passenger when the passenger makes a reservation; and reading said reservation information from said passenger recording medium when the passenger undergoes the check-in procedure.

4. The baggage receiving and handling method according to claim 1, further comprising a step of transporting baggage judged to be the passenger's baggage and to have passed the baggage security check based on the baggage security check result retrieved at the time of a passenger security check on the passenger.

5. An airport baggage receiving and handling system to receive a passenger's baggage, to identify the baggage and to process the baggage for the passenger's flight, the system comprising:

memory means for storing baggage identification information, a baggage security check result and passenger identification information, wherein at least the baggage identification information and the passenger identification information are cross-referenced with each other;

informing means for retrieving the baggage security check result stored in the memory means based on the passenger identification information at the time of a passenger security check, and conveying the baggage security check result to the passenger; and a sorting section for sorting the baggage that has passed the baggage security check.

6. The baggage receiving and handling system according to claim 5, wherein said sorting section sorts baggage according to flights, the baggage having passed the security check and being owned by passengers who passed a passenger security check.

7. The baggage receiving and handling system according to claim 5, further comprising a storage section for storing the baggage that has passed the security check.

8. The baggage receiving and handling system according to claim 5, further comprising checking means for providing identification information to identify the passenger and the passenger's baggage at the time of check-in procedures, wherein the baggage identification information and the passenger identification information to be stored in the memory means are received from the checking means.

9. The baggage receiving and handling system according to claim 8, further comprising reservation means for storing baggage information reported by a passenger when he makes a reservation, and providing reservation information to identify the reservation to the passenger, wherein said checking means provides at least one of said baggage identification information and said passenger identification information based on the reservation information.

10. The baggage receiving and handling system according to claim 9, wherein said checking means compares the reservation information and stored reservation information stored in said reservation means, and provides at least one of said baggage identification information and the passenger identification information if the reservation information is in agreement with the stored reservation information.

11. The baggage receiving and handling system according to claim 10, wherein said reservation means enters the reservation information on a passenger recording medium at the time of reservation, and said checking means reads the reservation information from said passenger recording medium at the time of check-in procedures.

12. The baggage receiving and handling system according to claim 10, further comprising:

tag issuing means for issuing a baggage tag indicating the baggage identification information provided by said checking means; and baggage receiving means for receiving baggage having the baggage tag attached, wherein the baggage security check is performed on the baggage received in said baggage receiving means.

13. The baggage receiving and handling system according to claim 11, further comprising:

tag issuing means for issuing a baggage tag indicating the baggage identification information provided by said checking means; and baggage receiving means for receiving baggage having the baggage tag attached, wherein the security check is performed on the baggage received in said baggage receiving means.

14. The baggage receiving and handling system according to claim 12, wherein the baggage receiving means is normally adapted to prevent receipt of baggage, and is adapted to receive baggage when the baggage identification information on the attached tag is in agreement with the stored baggage identification information.

15. The baggage receiving and handling system according to claim 13, wherein the baggage receiving means is normally adapted to prevent receipt of baggage, and is adapted to receive baggage when the baggage identification information on the attached tag is in agreement with the stored baggage identification information.

16. An automatic baggage handling apparatus for receiving baggage of a passenger who intends to board an airplane, the apparatus comprising:

reservation information memory means for storing boarding information input in advance as stored reservation information;

comparing means for comparing current reservation information entered at the time of baggage check-in procedures and the stored reservation information;

tag issuing means for issuing a baggage tag indicating the boarding information if the current reservation information is in agreement with the stored reservation information; and baggage receiving means for receiving the baggage having the baggage tag attached.

17. The automatic baggage handling apparatus according to claim 16, further comprising reading means for reading the reservation information recorded in a passenger recording medium of the passenger presented at the time of baggage check-in procedures, wherein said comparing means compares the reservation information read by said reading means and the stored reservation information.

18. The automatic baggage handling apparatus according to claim 16, further comprising:

forbidding means for preventing the baggage receiving means from receiving baggage; and control means for controlling and driving said forbidding means to to permit the baggage receiving means to receive baggage when said tag issuing means issues a baggage tag.

19. The automatic baggage handling apparatus according to claim 17, further comprising:

forbidding means for forbidding the baggage receiving means from receiving baggage; and control means for controlling and driving said forbidding means to to permit the baggage receiving means to receive baggage when said tag issuing means issues a baggage tag.

* * * * *